(12) United States Patent
Rangarajan et al.

(10) Patent No.: US 11,349,755 B2
(45) Date of Patent: May 31, 2022

(54) ROUTING DATA BETWEEN COMPUTING ENTITIES USING ELECTRONIC DATA INTERCHANGE

(71) Applicant: Bank of America Corporation, Charlotte, NC (US)

(72) Inventors: Prabakar Rangarajan, Chennai (IN); Ramesh Alagar, Chennai (IN); Rangarajan Lakshminarasimhan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 92 days.

(21) Appl. No.: 16/934,795

(22) Filed: Jul. 21, 2020

(65) Prior Publication Data

US 2022/0029912 A1  Jan. 27, 2022

(51) Int. Cl.
*H04L 45/00* (2022.01)
*H04L 45/02* (2022.01)

(52) U.S. Cl.
CPC .......... *H04L 45/566* (2013.01); *H04L 45/10* (2013.01); *H04L 45/72* (2013.01)

(58) Field of Classification Search
CPC ........ H04L 45/72; H04L 45/10; H04L 45/566
See application file for complete search history.

(56) References Cited

U.S. PATENT DOCUMENTS

| | | | |
|---|---|---|---|
| 5,557,780 A | 9/1996 | Edwards et al. | |
| 5,812,669 A | 9/1998 | Jenkins et al. | |
| 5,878,419 A | 3/1999 | Carter | |
| 5,946,669 A | 8/1999 | Polk | |
| 5,983,276 A | 11/1999 | Beckett et al. | |
| 6,418,400 B1 | 7/2002 | Webber | |
| 6,658,483 B1 | 12/2003 | Iwamoto et al. | |
| 6,764,009 B2 | 7/2004 | Melick et al. | |
| 7,043,687 B2 | 5/2006 | Knauss et al. | |
| 7,225,155 B1 | 5/2007 | Polk | |
| 7,245,611 B2 | 7/2007 | Narasimhan et al. | |

(Continued)

FOREIGN PATENT DOCUMENTS

| | | |
|---|---|---|
| EP | 0471867 B1 | 3/1996 |
| EP | 0553098 B1 | 12/1997 |

(Continued)

OTHER PUBLICATIONS

Ballentine et al., NPL "End-to-end Integration with IBM Sterling B2B Integration and Managed File Transfer Solutions", Published Jul. 21, 2012, pp. 263-265 (Year: 2012).*

*Primary Examiner* — Jackie Zuniga Abad (57) ABSTRACT

A system is provided for exchanging data using Electronic Data Interchange (EDI). A transmitting entity obtains an EDI file from a document that is to be transmitted to a destination server and adds routing information to the EDI file based on a first routing configuration, wherein the routing information is to be used by the receiving entity for routing the EDI file to the destination server. The receiving entity receives the EDI file from the transmitting entity and extracts the routing information from the EDI file. The receiving entity determines the destination server from a second routing configuration based on the extracted routing information and forwards the EDI file to the destination server.

11 Claims, 3 Drawing Sheets

(56) References Cited

U.S. PATENT DOCUMENTS

| | | |
|---|---|---|
| 7,281,211 B2 | 10/2007 | Jeannette et al. |
| 7,406,163 B2 | 7/2008 | Gilles |
| 7,437,665 B2 | 10/2008 | Perham |
| 7,447,707 B2 | 11/2008 | Gaurav et al. |
| 7,765,465 B2 | 7/2010 | Fetzer |
| 7,798,417 B2 | 9/2010 | Snyder et al. |
| 8,229,978 B2 | 7/2012 | Polk |
| 9,159,051 B2 | 10/2015 | Perham |
| 9,378,206 B2 | 6/2016 | Snyder et al. |
| 9,542,367 B2 | 1/2017 | Conners et al. |
| 2002/0019797 A1 | 2/2002 | Stewart et al. |
| 2002/0049790 A1 | 4/2002 | Ricker et al. |
| 2002/0083196 A1 | 7/2002 | Moyers |
| 2002/0156769 A1 | 10/2002 | Polk |
| 2003/0115499 A1 | 6/2003 | Chan |
| 2003/0236754 A1 | 12/2003 | Thompson |
| 2004/0107213 A1 | 6/2004 | Zubeldia et al. |
| 2005/0102170 A1 | 5/2005 | Lefever et al. |
| 2005/0273467 A1 | 12/2005 | Gardner |
| 2007/0143334 A1 | 6/2007 | Gaurav et al. |
| 2007/0143610 A1 | 6/2007 | Machiraju et al. |
| 2007/0143665 A1 | 6/2007 | Machiraju et al. |
| 2008/0059223 A1 | 3/2008 | Lu et al. |
| 2008/0071817 A1 | 3/2008 | Gaurav et al. |
| 2008/0168081 A1 | 7/2008 | Gaurav et al. |
| 2011/0130129 A1 | 6/2011 | Snyder et al. |
| 2014/0136961 A1 | 5/2014 | Mai et al. |
| 2014/0143099 A1* | 5/2014 | Wilkins ............... G06Q 10/087 705/28 |

FOREIGN PATENT DOCUMENTS

| | | |
|---|---|---|
| EP | 0891590 B1 | 7/2006 |
| WO | 9735268 A1 | 9/1997 |
| WO | 2006065250 A1 | 6/2006 |

\* cited by examiner

ROUTING DATA BETWEEN COMPUTING ENTITIES USING ELECTRONIC DATA INTERCHANGE

TECHNICAL FIELD

The present disclosure relates generally to data transfer between computing entities, and more specifically to routing data between computing entities using Electronic Data Interchange (EDI).

BACKGROUND

Electronic Data Interchange (EDI) is the automated, computer-to-computer exchange of standard electronic business documents between business partners over a secure, standardized connection. Some examples of the electronic business documents include purchase orders, invoices, shipping statuses, customs information, inventory documents and payment confirmations. The term EDI encompasses the entire electronic data interchange process, including the transmission, message flow, document format, and software used to interpret the documents. EDI documents are processed by computers using EDI standards. The EDI standards prescribe the formats, character sets, and data elements used in the exchange of business documents. There are a variety of EDI standards for various industries, regions and use cases, each with different versions. In order to exchange EDI documents, EDI partners must use the same standard and version. The format of an EDI document as defined by the EDI standards generally specifies information including a type of the document, parties involved, actions to take and date information. Example EDI document formats include PAYMUL (multiple payment order message), BANSTA (banking status message), IDOC (intermediate document), CSV (comma-separated values) and DIREB (direct debit file).

There are several deficiencies associated with existing EDI implementations. A receiving EDI gateway needs to parse a received EDI file and decipher the format of the file in order to make a decision regarding which recipient system or application the incoming file needs to be routed to for processing. For example, an EDI file having a standard PAYMUL format may need to be routed to a payment system or application and another EDI file having a standard IDOC format may need to be routed to a trade system or application. EDI files exchanged between business partners are often large in size (e.g., an EDI file for salary payments for a large corporation). Opening a large file in order to determine the format of the file uses considerable computing resources. This issue is compounded when a receiving EDI gateway handles large volumes of incoming data. This places a significant resource and time burden on the EDI gateway. If parsing of the incoming files is to be avoided at the EDI gateway, customers generally have to implement messy workarounds and duplicate setups in order to determine routing for an incoming EDI file. Further, a customer may have multiple regional systems and/or applications associated with the same EDI format. The existing EDI implementations do not provide an efficient method for determining the right regional system or application for a received EDI file and the EDI file often hops across multiple regional servers before finding the right regional system or application for processing the EDI file.

SUMMARY

The system and methods implemented by the system as disclosed in the present disclosure provide technical solutions to the technical problems discussed above by including routing information in EDI files such that the file does not need to be opened and parsed at the EDI gateway level for determining the format of the EDI file. The disclosed system and methods provide several practical applications and technical advantages. In one embodiment, an EDI transmitting entity adds routing information to an EDI file based on a routing configuration and transmits the EDI file using an EDI transmission protocol. The routing information added to the EDI file includes at least one of information relating to a format of the EDI file or information relating to a geographical region of a destination server to which the EDI file is to be routed. An EDI receiving entity receives the EDI file, extracts the routing information from the EDI file and identifies the destination server from a second routing configuration based on the extracted routing information from the EDI file. The EDI receiving entity then forwards the EDI file to the identified destination server. The second routing configuration defines a destination server for each of a plurality of combinations of an identity of the transmitting entity, a format of the received EDI file and a geographical region of the destination server. The routing information included in the EDI file by the EDI transmitting entity allows the receiving EDI gateway to route EDI files to the right destination server without opening and parsing the files. This reduces the resource and time burden at the EDI gateway. Further, including information regarding the geographical region of the destination server in the EDI file allows the EDI gateway to determine the right destination server among multiple regional servers. The system and methods disclosed herein may improve the efficiency of a computing system by causing the computing system to make a routing decision for forwarding an incoming EDI file faster than a traditional EDI system.

Certain aspects of the present disclosure may include some, all, or none of these advantages. These advantages and other features will be more clearly understood from the following detailed description taken in conjunction with the accompanying drawings and claims.

In certain aspects, a system includes a transmitting entity and a receiving entity. The transmitting entity includes a first storage device and a routing enricher. The first storage device stores a first routing configuration for adding routing information to an EDI file to be transmitted according to an EDI standard using an EDI transmission protocol. The routing enricher is implemented by a first processor and is operatively coupled to the first storage device. The first processor is configured to obtain the EDI file from a document to be transmitted to a destination server and add the routing information to the EDI file based on the first routing configuration, wherein the routing information is to be used for routing the EDI file to the destination server. After adding the routing information, the first processor transmits the EDI file using the EDI transmission protocol. The receiving entity includes a second storage device and a routing gateway. The second storage device stores a second routing configuration for determining the destination server for routing the EDI file based on the routing information in the EDI file. The routing gateway is implemented by a second processor operatively coupled to the second storage device. The second processor is configured to receive the EDI file from the transmitting entity, extract the routing information from the EDI file, determine the destination server from the second routing configuration based on the routing information, and forward the EDI file to the destination server.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
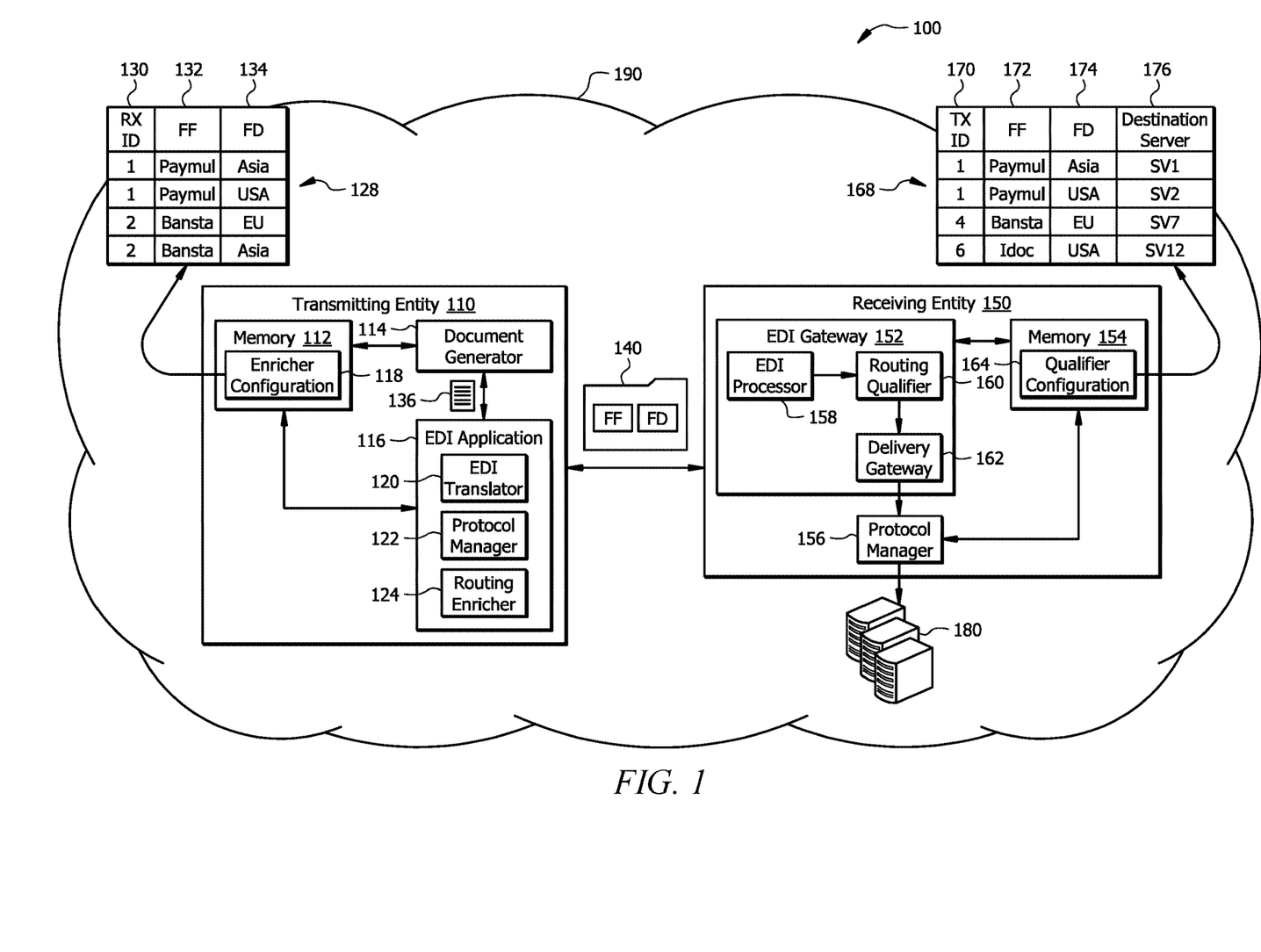
FIG. 1 is a schematic diagram of an EDI system configured to exchange EDI files between computing entities, in accordance with certain aspects of the present disclosure.

FIG. 1 is a schematic diagram of an EDI system 100 configured to exchange EDI files between computing entities, in accordance with certain aspects of the present disclosure. As shown in FIG. 1, the EDI system 100 includes a transmitting entity 110 in communication with a receiving entity 150. The transmitting entity 110 includes a memory device 112 operatively coupled with a document generator 114 and an EDI application component 116. The receiving entity 150 includes a memory device 154 operatively coupled with an EDI gateway 152 and a protocol manager 156.

In certain aspects, the transmitting entity 110 or the receiving entity 150 or each of both may include a computing device running one or more software applications. For example, the transmitting entity 110 may be representative of a computing system hosting software applications that may be installed and run locally or may be used to access software applications running on a server. Similarly, the receiving entity 150 may be representative of a computing system hosting software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. Alternatively, the transmitting entity 110 or the receiving entity 150 or each of both may be representative of a server running one or more software applications to provide one or more EDI related services described below.

In an aspect, the document generator 114 and the EDI application 116 at the transmitting entity 110 may be software applications implemented by at least one processor executing software instructions stored in the memory device 112. Similarly, the EDI gateway 152 and the protocol manager 156 at the receiving entity 150 may be software applications implemented by at least one processor executing software instructions stored in the memory device 154.

As shown in FIG. 1, the receiving entity 150 may be connected to one or more destination servers 180. Each destination server 180 may run one or more applications that process EDI files received from the transmitting entity 110. The receiving entity 150 may be representative of a gateway server responsible for receiving incoming EDI files and making routing decisions to properly route the EDI files to the appropriate destination servers 180.

The transmitting entity 110, the receiving entity 150 and the destination servers 180 may be connected to a network 190. The transmitting entity 110, the receiving entity 150 and the destination servers 180 may communicate with each other over the network 190. The network 190, in general, may be a wide area network (WAN), personal area network (PAN), a cellular network, or any other technology that allows devices to communicate electronically with other devices. In one or more aspects, the network 190 may be the internet.

The EDI system 100 may be used to efficiently and accurately route EDI files 140 transmitted by the transmitting entity 110 to one or more destination servers 180 via the receiving entity 150. The EDI system 100 accomplishes the routing of an EDI file 140 by adding routing information to the EDI file 140 before it is transmitted by the transmitting entity 110. As described below, the receiving entity 150 may extract the routing information from the EDI file 140 and determine how to route the EDI file 140 without opening and parsing the EDI file 140. A routing configuration (shown as enricher configuration 118) is used at the transmitting entity 110 to determine the proper routing information to be inserted in an outgoing EDI file 140. Another routing configuration (shown as routing configuration 154) is used at the receiving entity 150 for translating the routing information and make routing decisions.

Transmitting Entity

The various components of the transmitting entity 110 and their respective functions will now be described in more detail.

Document Generator

The document generator 114 of the transmitting entity 110 is configured to generate one or more documents 136 for transmission to the receiving entity 150. The type of document 136 generated by the document generator 114 depends on a real-world application for which the EDI system 100 is implemented. The EDI system 100 may be implemented for a variety of real-world applications including supply chain, logistics, accounting and aviation. For example, in a supply chain application the EDI system 100 may be used to exchange documents relating to purchasing, order fulfillment, shipping confirmations, international orders, parts order fulfillments and the like. In this context, the documents may include purchase orders, invoices, shipping statuses, customs information, inventory documents and payment confirmations.

The document generator 114 may generate a document 136 automatically in response to a trigger event. For example, following the supply chain example, a buyer's procurement system may auto-generate a purchase order (PO) when inventory reaches a pre-specified level. Alternatively, the document 136 may be manually generated by a user using the document generator 136. For example, an inventory manager may use a user interface provided on a user terminal of the transmitting entity 110 in order to manually generate the PO by using the document generator 114.

EDI Application

The EDI application component 116 is configured to process documents 136 generated by the document generator 114 in accordance with at least one EDI standard and at least one EDI protocol before transmitting as an EDI file 140. The processing includes converting each document 136 into a standard EDI format in accordance with an EDI standard, processing the document 136 based on an EDI protocol to generate an EDI file 140 and adding routing information to the EDI file 140. As shown in FIG. 1, the EDI application 116 includes an EDI translator 120, a protocol manager 122 and a routing enricher 124.

The EDI translator 120 converts a document 136 generated by the document generator 114 into a standard EDI format as defined in an EDI standard. The EDI standards prescribe the formats, character sets, and data elements used in the exchange of business documents. There are a variety of EDI standards for various industries, regions and use cases, each with different versions. In order to exchange EDI documents, EDI partners must use the same standard and version. The format of an EDI document as defined by the EDI standards generally specifies information including a type of the document, parties involved, actions to take and date information. The EDI translator 120 converts the document 136 to the standard EDI format by including the appropriate segments and data elements as defined in the EDI standard used by the transmitting entity 110 and the receiving entity 150. The EDI translator 120 selects a standard EDI format for the translation based on the type of the generated document 136. Following the purchase order example, the EDI translator 120 translates a purchase order document generated by the document generator 114 into a standard EDI 850 purchase order format.

The protocol manager 122 processes the document 136 based on an EDI communication protocol to be used to transmit the EDI file 140. EDI uses a range of secure protocols to facilitate the secure exchange of EDI files between partners. EDI protocols are the technologies used by EDI software to transfer data securely from one computer to another. Each protocol reflects a set of universal guidelines that dictate how the data is encrypted and configured while in transit. Partners must use the same, agreed-upon protocol to exchange EDI files or work with an intermediary who can facilitate exchanges if the partners use different protocols. There are many types of EDI messaging protocols, each created to use different types of data exchange technologies and EDI software to send and receive data. The following description describes the methods for routing an EDI file 140 with reference to three standard EDI communication protocols including Applicability Statement 1 (AS1), Applicability Statement 2 (AS2) and Applicability Statement 3 (AS3). However, it may be noted that the disclosed methods equally apply to other standard EDI communication protocols.

AS1 stands for Applicability Statement 1 and specifies how to transport data securely and reliably via the Internet using email protocols. The AS1 protocol is based on Simple Mail Transfer Protocol (SMTP) and Secure/Multipurpose Internet Mail Extensions (S/MIME) (email technologies), wherein files are sent as "attachments" in specially coded email messages.

AS2 enables secure and reliable data transmission over the Internet using HTTP (Hypertext Transfer Protocol) or HTTP Secure (HTTPS). AS2 creates an "envelope" for the EDI data, allowing it to be sent securely using digital certificates and encryption over the Internet.

AS3 is built on File Transfer Protocol (FTP). AS3 provides tight security on par with that of AS2 by implementing Message Disposition Notifications (MDNs) in combination with encryption. Digital signatures and encryption make AS3 more secure than both traditional FTP and File Transfer Protocol Secure (FTPS), which uses Secure Sockets Layer (SSL) in combination with FTP. AS3 improves on the way FTPS encrypts data by allowing firewalls to inspect the flow of network traffic.

The protocol manager 122 processes the document 136 in accordance with the EDI communication protocol (e.g., AS1, AS2 or AS3) agreed for exchange of EDI data between the transmitting entity 110 and the receiving entity 150, to generate an EDI file 140. This processing may include applying digital signatures to the outgoing EDI file 140 and encrypting the EDI file 140 in accordance with the EDI protocol used.

Routing Enricher

The routing enricher 124 is configured to add routing information to an outgoing EDI file 140 to assist the receiving entity 150 in routing the EDI file 140 to an appropriate destination server 180. The routing information added to an EDI file 140 may include at least one of information relating to a format of the EDI file 140 or information relating to a geographical region of the destination server 180 the EDI file 140 is to be routed to. The following disclosure uses the term "File Format (FF)" to represent the information relating to a format of the EDI file, and uses the term "File Disposition" to represent the information relating to a geographical region of the destination server. The file format information may include information relating to a standard EDI format used by the EDI translator 120 to format the EDI file 136. Following the purchase order example, the file format information may include the code "EDI 850" representing the standard EDI 850 purchase order format. The file disposition information may include an identity, name or code of a geographical region within which the destination server 180 is located. The file disposition information may include an identity, name or code of a continent, country, state, county, province, city, a region including multiple countries, states and cities, or a combination thereof. Examples of file disposition information may include "Asia", "Europe", "USA", "China", "Singapore", "London", "Sydney", "Asia-Pacific" or the like.

The routing enricher 124 adds the routing information to the EDI file 140 in such a way that the receiving entity 150 does not need to open the EDI file in order to read the routing information. The manner in which the routing information is added to the EDI file 140 is determined by the EDI communication protocol used to transmit the EDI file 140.

When the EDI file 140 is to use the AS1 protocol wherein the EDI file 140 is to be sent as an attachment to an email message, the file format and file disposition information may be added to a subject field of the email message. When an EDI file 140 is sent as an attachment to an email message, the subject field of the email message generally contains little to no information. This unused space in the subject field may be used to include the file format and file disposition information.

When the EDI file 140 is to use the AS2 protocol for transmission over the Internet using HTTP/HTTPS, the file format and the file disposition information may be added to a subject field of the HTTP/HTTPs form data.

When the EDI file 140 is to use the AS3 protocol for transmission using FTP, the file format and file disposition information may be included in a file name of the FTP file transmitted to the receiving entity 150. The file format and the file disposition information may be added to the file name of the FTP file or the file name of the FTP file may be re-written as the file format and the file disposition information.

A routing configuration may be used at the transmitting entity 110 in order to determine the appropriate routing information (e.g., FF and FD) to be added to an outgoing EDI file 140. In FIG. 1, the routing configuration at the transmitting entity 110 is represented by an enricher configuration 118. As shown in FIG. 1, the enricher configuration 118 may be stored in the memory device 112 and may be accessed by the routing enricher 124 for determining the file format and file disposition information to be added to the EDI file 136. As shown, the enricher configuration 118 stored in the memory device 112 includes a routing table 128 having customized routing information for each of a plurality of receiving entities that may receive EDI files from the transmitting entity 110. As shown, the routing table 128 includes three columns, one column for each of an identity 130 of a receiving entity 150 (shown as RX ID), a format code 132 for an EDI file format (shown as FF) and a geographical region code 134 (shown as FD). Thus, each row of the table 128 includes a unique combination of a receiving entity ID, a file format and a file disposition. The routing enricher 124 may select the appropriate FF and FD to add to an EDI file 140 based on which receiving entity 150 the EDI file is to be transmitted to, what type of document is included in the EDI file and which geographic location the file is meant for. For example, for sending a payment order message to the Asian regional server of a bank having RX ID 1, the routing enricher 124 may select the FF code "PAYMUL" and FD code "ASIA" from the first row of the table 128 for addition to the outgoing EDI file 140 for the payment order message.

Receiving Entity

The various components of the receiving entity 150 and their respective functions will now be described in more detail.

EDI Gateway

The EDI gateway 152 of the receiving entity 150 is configured to receive an EDI file 140 from the transmitting entity 110, extract routing information (e.g., FF ad FD information) from the EDI file 140, determine the appropriate destination server 180 for routing the EDI file 140 based on the extracted routing information and forward the EDI file 140 to the destination server 180. As shown in FIG. 1, the EDI gateway 152 includes an EDI processor 158, a routing qualifier 160 and a delivery gateway 162. The EDI processor 158 is configured to identify and verify the transmitting entity 110 that sent the EDI file 140, and further to determine the EDI communication protocol (e.g., AS1, AS2 or AS3) used for transmitting the EDI file 140. The EDI processor 158 identifies and verifies the transmitting entity 110 by verifying a unique digital signature of the transmitting entity 110 included in the EDI file 140. The EDI communication protocol used for transmitting the EDI file 140 is generally pre-negotiated and agreed by the transmitting entity 110 and the receiving entity 150. Thus, once the EDI processor 158 identifies the transmitting entity 110, it may determine the EDI communication protocol used by the transmitting entity 110 for transmitting the EDI file 140 to the receiving entity 150.

Routing Qualifier

The routing qualifier 160 is configured to extract routing information from the EDI file 140 and determine how to route the EDI file 140 based on the extracted routing information. As described above, the routing information may be added to the EDI file 140 at the transmitting entity 110 and may include at least one of information relating to a standard EDI file format (FF) or information relating to file disposition (FD) which includes information relating to a geographical region the EDI file 140 is meant for. The routing qualifier 160 may determine where to look for the routing information (e.g., FF and FD) in an EDI file 140 based on the EDI transmission protocol used for transmitting the EDI file 140 as determined by the EDI processor 158. If AS1 protocol was used to transmit the EDI file 140 as an attachment to an email message, the routing qualifier 160 may extract the routing information from the subject field of the email. If AS2 protocol was used to transmit the EDI file 140 over the Internet using HTTP/HTTPS, the routing qualifier 160 may extract the routing information from the subject field of the HTTP/HTTPs form data. If AS3 protocol was used to transmit the EDI file using FTP, the routing qualifier 160 may extract the routing information from the file name of the FTP file.

Once the file format and file disposition information is extracted from the EDI file 140, the routing qualifier 160 may determine how to route the EDI file 140. A routing configuration may be used by the routing qualifier 160 to determine a destination server 180 to forward the EDI file 140. In FIG. 1, the routing configuration at the receiving entity 150 is represented by qualifier configuration 164. As shown, the qualifier configuration 164 may be stored in memory device 154 and may be accessed by the routing qualifier 160 for determining a destination server 180 based on the file format and file disposition information extracted from the EDI file 140. As shown, the qualifier configuration 164 may include a configuration table 168 having four columns, one column for each of an identity 170 of the transmitting entity (shown as TX ID), a format code 172 for the EDI file format (FF), an FD code 174 indicating a geographical region and an identity 176 of a destination server 180. Thus, the configuration table 168 provides a destination server 180 for each combination of the TX ID 170 of the transmitting entity that transmitted the EDI file 140, the file format of the EDI file 140 and the geographical region the EDI file 140 is meant for as indicated by the file disposition information.

The routing qualifier 160 may determine the destination server 180 for the received EDI file 140 from the configuration table 168 based on the TX ID of the transmitting entity 110 (e.g., as determined by the EDI processor 158) and the file format and file disposition information extracted from the EDI file 140. Following the payment order example described above in the context of the routing enricher 124, if the EDI file 140 is received from the transmitting entity 110 having TX ID "1" and includes an FF code "PAYMUL" and an FD code "ASIA", the routing qualifier 160 may identify the destination server 180 for routing the EDI file 140 as "SV1" from the first row of the configuration table 168.

The delivery gateway 162 is configured to determine the network address of the destination server 180 identified by the routing qualifier 160 for forwarding the EDI file 140. For example, if AS1 protocol was used to transmit the EDI file 140, the network address of the destination server 180 may include an email address pointing to the destination server 180. If AS2 protocol was used to transmit the EDI file 140, the network address of the destination server 180 may include an HTTP/HTTPS URL (Uniform Resource Locator) pointing to the destination server 180. If AS3 protocol was used to transmit the EDI file 140, the network address of the destination server 180 may include an Internet Protocol (IP) address of the destination server 180.

The protocol manager 156 is configured to process the EDI file 140 based on the EDI communication protocol used to transmit the EDI file 140 in order to extract the document 136 transmitted in the EDI file 140. The processing may include decrypting the document 136 and verifying the document 136. The document 136 may then be forwarded to the identified destination server 180.

It may be noted that the functionalities of both the transmitting entity 110 and the receiving entity 150 as discussed above may be implemented in a single computing device. For example, the transmitting entity 110 may include the one or more components of the receiving entity 150 shown in FIG. 1. Similarly, the receiving entity 150 may include the one or more components of the transmitting entity 110 shown in FIG. 1. This may be useful when business partners exchange business documents and there is a two-way flow of EDI documents between the business partners. This means that each business partner needs to have capabilities to transmit as well as receive EDI documents. For example, in a supply chain implementation of the EDI system 100, a buyer's EDI system may need to transmit out purchase orders to a vendor's EDI system for purchase of goods and then also receive invoices from the vendor's EDI system after fulfillment of the purchase order. In this context, both the buyer's EDI system and the vendor's EDI system need to include EDI transmitting and receiving capabilities.

Figure 2:
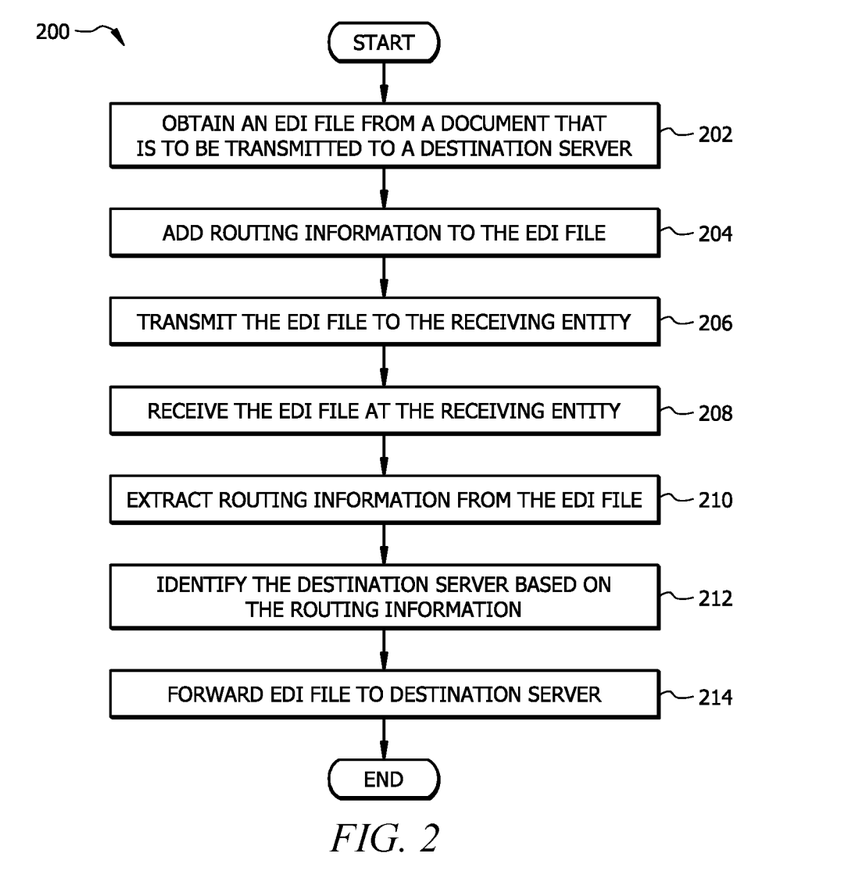
FIG. 2 is a flowchart of a method for routing an EDI file to a destination server, in accordance with certain aspects of the present disclosure.

FIG. 2 is a flowchart of a method 200 for routing an EDI file (e.g., EDI file 140) to a destination server (e.g., destination server 180), in accordance with certain aspects of the present disclosure. At least a portion of the method 200 described herein may be performed by a combination of the routing enricher 124 of the transmitting entity 110 and the routing qualifier 160 of the receiving entity 150.

At step 202, the EDI translator 120 at the transmitting entity 110 obtains an EDI file 140 from a document 136 that is to be transmitted to a destination server 180. As described above, the document generator 114 of the transmitting entity 110 generates a document 136 for transmission to the receiving entity 150. The type of document 136 generated by the document generator 114 depends on a real-world application the EDI system 100 is implemented for. The document generator 114 may generate a document 136 automatically in response to a trigger event. Alternatively, the document 136 may be manually generated by a user using the document generator 136. The EDI translator 120 converts the document 136 generated by the document generator 136 into a standard EDI format as defined in an EDI standard. The EDI translator 120 converts the document 136 in the standard EDI format by including the appropriate segments and data elements as defined in the EDI standard used by the transmitting entity 110 and the receiving entity 150. The EDI translator 120 selects a standard EDI format for the translation based on the type of the generated document 136. For example, the EDI translator 120 translates a purchase order document generated by the document generator 114 into a standard EDI 850 purchase order format.

At 204, the routing enricher 124 adds routing information to the EDI file 140 based on a first routing configuration (e.g., enricher configuration 118), wherein the routing information is to be used by the receiving entity 150 for routing the EDI file 140 to the destination server 180. The routing information added to the EDI file 140 may include at least one of information relating to a format of the EDI file (e.g., FF information) or information relating to a geographical region of the destination server (e.g., FD information), wherein the format of the EDI file 140 corresponds to a type of the document 136.

The manner in which the routing information is added to an EDI file 140 is determined by the EDI communication protocol used to transmit the EDI file 140. For example, when the EDI file 140 is to use the AS1 protocol wherein the EDI file 140 is to be sent as an attachment to an email message, the routing information may be added to a subject field of the email message. When the EDI file 140 is to use the AS2 protocol for transmission over the Internet using HTTP/HTTPS, the routing information may be added to a subject field of the HTTP/HTTPs form data. When the EDI file 140 is to use the AS3 protocol for transmission using FTP, the routing information may be included in a file name of the FTP file transmitted to the receiving entity 150.

The first routing configuration may be used at the transmitting entity 110 in order to determine the appropriate routing information (e.g., FF and FD) to be added to an outgoing EDI file 140. The first routing configuration is represented as the enricher configuration 118 in FIG. 1. The enricher configuration 118 includes a routing table 128 having customized routing information for each of a plurality of receiving entities that may receive EDI files from the transmitting entity 110. The routing table 128 includes three columns, one column for each of an identity 130 of a receiving entity 150 (shown as RX ID), an FF code 132 for an EDI file format and an FD code 134 indicating a geographical region code. Thus, each row of the table 128 includes a unique combination of a receiving entity ID 130, FF code 132 and FD code 134. The routing enricher 124 may select the appropriate FF code 132 and FD code 134 to add to an EDI file 140 based on which receiving entity 150 the EDI file is to be transmitted to, what type of document is included in the EDI file 140 and which geographic location the file is meant for.

At 206, the transmitting entity 110 transmits the EDI file 140 to the receiving entity 150.

At 208, the receiving entity 150 receives the EDI file 140 transmitted by the transmitting entity 110.

At 210, the routing qualifier 160 extracts the routing information from the EDI file 140. As described above, the EDI processor 158 of the receiving entity 150 identifies and verifies the transmitting entity 110 that sends the EDI file 140, and further determines the EDI communication protocol (e.g., AS1, AS2 or AS3) used for transmitting the EDI file 140.

The routing qualifier 160 may determine where to look for the routing information (e.g., FF, FD codes) in the EDI file 140 based on the EDI transmission protocol used for transmitting the EDI file 140 as determined by the EDI processor 158. If AS1 protocol was used to transmit the EDI file 140 as an attachment to an email message, the routing qualifier 160 may extract the routing information from the subject field of the email. If AS2 protocol was used to transmit the EDI file 140 over the Internet using HTTP/HTTPS, the routing qualifier 160 may extract the routing information from the subject field of the HTTP/HTTPs form data. If AS3 protocol was used to transmit the EDI file using FTP, the routing qualifier 160 may extract the routing information from the file name of the FTP file.

At 212, the routing qualifier 160 identifies the destination server 180 for the EDI file 140 from a second routing configuration (e.g., qualifier configuration 164) based on the routing information extracted from the EDI file 140.

The second routing configuration is represented by the qualifier configuration 164 as shown in FIG. 1. The qualifier configuration 164 may be stored in memory device 154 and may be accessed by the routing qualifier 160 for determining a destination server 180 based on the file format and file disposition information extracted from the EDI file 140. The qualifier configuration may include a configuration table 168 having four columns, one column for each of an identity 170 of the transmitting entity (shown as TX ID), an FF code 172 for the EDI file format, a FD code 174 indicating a geographical region and an identity 176 of a destination server 180. Thus, the configuration table 168 provides a destination server 180 for each combination of the transmitting entity 110 transmitting the EDI file 140, the file format of the transmitted EDI file 140 and the geographical region the EDI file 140 is meant for. The routing qualifier 160 may determine the destination server 180 for the received EDI file 140 from the configuration table 168 based on the TX ID 170 of the transmitting entity 110 (e.g., as determined by the EDI processor 158) and the file format and file disposition information extracted from the EDI file 140.

At 214, the receiving entity 150 forwards the EDI file 140 to the identified destination server 180.

Figure 3:
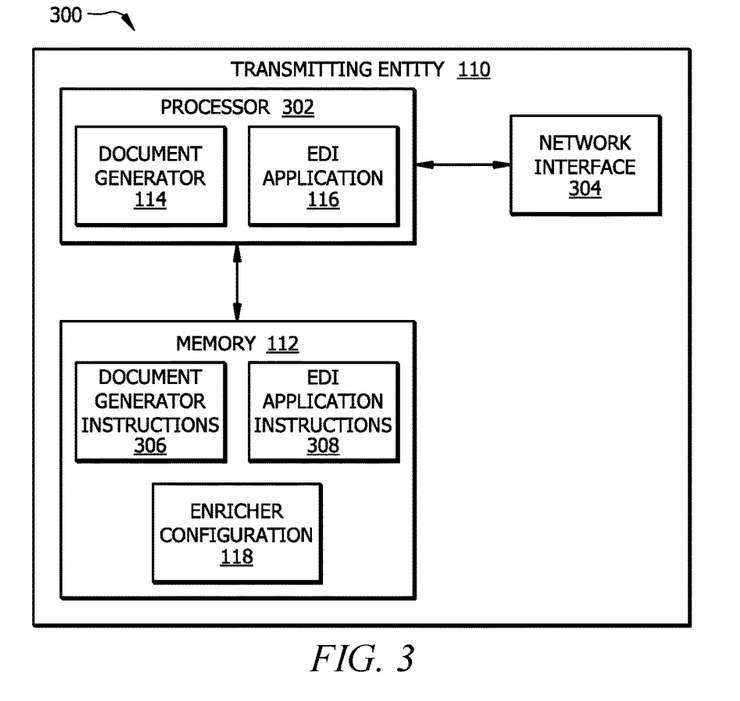
FIG. 3 illustrates an example schematic diagram of a transmitting entity, in accordance with one or more aspects of the present disclosure.

FIG. 3 illustrates an example schematic diagram 300 of a transmitting entity 110, in accordance with one or more aspects of the present disclosure. Transmitting entity 110 comprises a processor 302, a memory 112, and a network interface 304. The transmitting entity 110 may be configured as shown in FIG. 3 or in any other suitable configuration.

The processor 302 comprises one or more processors operably coupled to the memory 112. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 112. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (document generator instructions 306 and EDI application instructions 308) to implement a document generator 114 and the EDI application 116. In this way, processor 302 may be a special-purpose computer designed to implement the functions disclosed herein. In one or more aspects, each of the document generator 114 and the EDI application 116 is implemented using logic units, FPGAs, ASICs, DSPs, or any other suitable hardware. The document generator 114 and the EDI application 116 are configured to operate as described with reference to FIGS. 1 and 2. For example, the document generator 114 and the EDI application 116 may be configured to perform at least a portion of the flowchart 200 as described in FIG. 2, respectively.

The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store the document generator instructions 306, the EDI application instructions 308, the enricher configuration 118 and/or any other data or instructions. Each of the document generator instructions 306, the EDI application instructions 308 may include any suitable set of instructions, logic, rules, or code operable to execute the document generator 114 and the EDI application 116 respectively. It may be noted that the EDI application instructions 308 may include instructions to implement each component of the EDI application 116 including the EDI translator 120, the protocol manager 122 and the routing enricher 124.

The network interface 304 is configured to enable wired and/or wireless communications. The network interface 304 is configured to communicate data between the transmitting entity 110 and other devices (e.g. receiving entity 150), systems, or domains. For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

Figure 4:
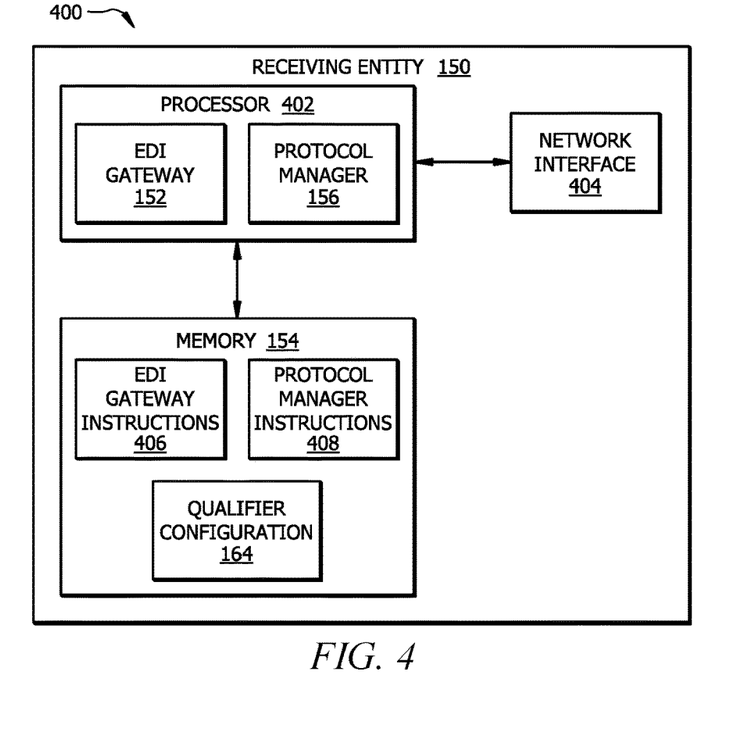
FIG. 4 illustrates an example schematic diagram of a receiving entity, in accordance with one or more aspects of the present disclosure.

FIG. 4 illustrates an example schematic diagram 400 of a receiving entity 150, in accordance with one or more aspects of the present disclosure. Receiving entity 150 includes a processor 402, a memory 154, and a network interface 404. The receiving entity 150 may be configured as shown in FIG. 4 or in any other suitable configuration.

The processor 402 comprises one or more processors operably coupled to the memory 154. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 154. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (EDI gateway instructions 406 and protocol manager instructions 408) to implement the EDI gateway 152 and the protocol manager 156. In this way, processor 402 may be a special-purpose computer designed to implement the functions disclosed herein. In one or more aspects, each of the EDI gateway 152 and the protocol manager 156 is implemented using logic units, FPGAs, ASICs, DSPs, or any other suitable hardware.

The EDI gateway 152 and the protocol manager 156 are configured to operate as described with reference to FIGS. 1 and 2. For example, the EDI gateway 152 and the protocol manager 156 may be configured to perform at least a portion of the flowchart 200 as described in FIG. 2, respectively.

The memory 154 comprises one or more disks, tape drives, or solid-state drives, and may be used as an over-flow data storage device, to store programs when such programs are selected for execution, and to store instructions and data that are read during program execution. The memory 154 may be volatile or non-volatile and may comprise a read-only memory (ROM), random-access memory (RAM), ternary content-addressable memory (TCAM), dynamic random-access memory (DRAM), and static random-access memory (SRAM).

The memory 154 is operable to store the EDI gateway instructions 406, the protocol manager instructions 408, the qualifier configuration 164 and/or any other data or instructions. Each of the EDI gateway instructions 406 and protocol manager instructions 408 may include any suitable set of instructions, logic, rules, or code operable to execute the EDI gateway 152 and the protocol manager 156 respectively. It may be noted that the EDI gateway instructions 406 may include instruction to implement each component of the EDI gateway 152 including the EDI processor 158, the routing qualifier 160 and the delivery gateway 162.

The network interface 404 is configured to enable wired and/or wireless communications. The network interface 404 is configured to communicate data between the receiving entity 150 and other devices (e.g. transmitting entity 110), systems, or domains. For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a transmitting entity comprising:
a first storage device that stores a first routing configuration for adding routing information to an Electronic Data Interchange (EDI) file to be transmitted according to an EDI standard using an EDI transmission protocol; and
a routing enricher implemented by a first processor operatively coupled to the first storage device, the first processor configured to:
obtain the EDI file from a document that is to be transmitted to a destination server;
add the routing information to the EDI file based on the first routing configuration, wherein the routing information added to the EDI file comprises:
information relating to a format of the EDI file, the format corresponding to a type of the document; and
information relating to a geographical region of the destination server; and
transmit the EDI file using the EDI transmission protocol; and
a receiving entity comprising:
a second storage device that stores a second routing configuration for determining the destination server for routing the EDI file based on the routing information in the EDI file, wherein the second routing configuration defines the destination server for each of a plurality of combinations of an identity of the transmitting entity, the format of the received EDI file and the geographical region of the destination server; and
a routing gateway implemented by a second processor operatively coupled to the second storage device, the second processor configured to:
receive the EDI file from the transmitting entity;
extract the routing information from the EDI file;
determine the destination server from the second routing configuration based on the routing information by:
identifying the identity of the transmitting entity; and
identifying the destination server from the second routing configuration based on a combination of the identity of the transmitting entity, the format of the EDI file and the geographical region of the destination server; and
forward the EDI file to the destination server.

2. The system of claim 1, wherein the first processor is configured to add the routing information to the EDI file by:
determining that the EDI transmission protocol comprises Applicability Statement 1 (AS1) protocol, wherein the EDI file is to be sent as an attachment to an email message as defined by the AS1 protocol; and
adding the routing information to a subject field of the email message.

3. The system of claim 1, wherein the first processor is further configured to add the routing information to the EDI file by:
determining that the EDI transmission protocol comprises Applicability Statement 2 (AS2) protocol, wherein the EDI file is to be transmitted over the internet using Hypertext Transfer Protocol Secure (HTTPS) as defined by the AS2 protocol; and
adding the routing information to a subject field of an HTTPS file used for transmitting the EDI file.

4. The system of claim 1, wherein the first processor is further configured to add the routing information to the EDI file by:
- determining that the EDI transmission protocol comprises Applicability Statement 3 (AS3) protocol, wherein the EDI file is to be transmitted using File Transfer Protocol (FTP) as defined by the AS3 protocol; and
- adding the routing information to a name of an FTP file used for transmitting the EDI file.

5. The system of claim 1, wherein the first routing configuration defines a geographical region of the destination server based on an identity of the transmitting entity and the format of the EDI file, wherein the routing information includes information relating to the geographical region of the destination server.

6. A method for exchanging data using Electronic Data Interchange (EDI), the method comprising:
- performing at a transmitting entity:
  - obtaining a first routing configuration for adding routing information to an EDI file to be transmitted according to an EDI standard using an EDI transmission protocol;
  - obtaining the EDI file from a document that is to be transmitted to a destination server;
  - adding the routing information to the EDI file based on the first routing configuration, wherein the routing information added to the EDI file comprises:
    - information relating to a format of the EDI file, the format corresponding to a type of the document; and
    - information relating to a geographical region of the destination server; and
  - transmitting the EDI file from the first transmitting entity using the EDI transmission protocol; and
- performing at a receiving entity:
  - receiving the EDI file from the transmitting entity;
  - extracting the routing information from the EDI file;
  - obtaining a second routing configuration for determining the destination server for routing the EDI file based on the routing information in the EDI file, wherein the second routing configuration defines the destination server for each of a plurality of combinations of an identity of the transmitting entity, the format of the received EDI file and the geographical region of the destination server;
  - determining the destination server from the second routing configuration based on the routing information by:
    - identifying the identity of the transmitting entity; and
    - identifying the destination server from the second routing configuration based on a combination of the identity of the transmitting entity, the format of the EDI file and the geographical region of the destination server; and
  - forwarding the EDI file to the destination server.

7. The method of claim 6, wherein adding the routing information to the EDI file comprises:
- determining that the EDI transmission protocol comprises Applicability Statement 1 (AS1) protocol, wherein the EDI file is to be sent as an attachment to an email message as defined by the AS1 protocol; and
- adding the routing information to a subject field of the email message.

8. The method of claim 6, wherein adding the routing information to the EDI file comprises:
- determining that the EDI transmission protocol comprises Applicability Statement 2 (AS2) protocol, wherein the EDI file is to be transmitted over the internet using Hypertext Transfer Protocol Secure (HTTPS) as defined by the AS2 protocol; and
- adding the routing information to a subject field of an HTTPS file used for transmitting the EDI file.

9. The method of claim 6, wherein adding the routing information to the EDI file comprises:
- determining that the EDI transmission protocol comprises Applicability Statement 3 (AS3) protocol, wherein the EDI file is to be transmitted using File Transfer Protocol (FTP) as defined by the AS3 protocol; and
- adding the routing information to a name of an FTP file used for transmitting the EDI file.

10. The method of claim 6, wherein the first routing configuration defines a geographical region of the destination server based on an identity of the transmitting entity and the format of the EDI file, wherein the routing information includes information relating to the geographical region of the destination server.

11. A receiving entity comprising:
- a storage device that stores a routing configuration for determining a destination server for an EDI file received from a transmitting entity based on routing information in the EDI file, wherein the routing information in the EDI file comprises:
  - information relating to a format of the EDI file, the format corresponding to a type of a document being transmitted in the EDI file; and
  - information relating to a geographical region of the destination server; and
- wherein the routing configuration defines the destination server for each of a plurality of combinations of an identity of the transmitting entity, the format of the received EDI file and the geographical region of the destination server; and
- a routing gateway implemented by a processor operatively coupled to the storage device, the processor configured to:
  - receive the EDI file from the transmitting entity;
  - extract the routing information from the EDI file;
  - determine the destination server from the routing configuration based on the routing information by
    - identifying the identity of the transmitting entity; and
    - identifying the destination server from the routing configuration based on a combination of the identity of the transmitting entity, the format of the EDI file and the geographical region of the destination server; and
  - forward the EDI file to the destination server.

* * * * *